United States Patent [19]
Kozak et al.

[11] Patent Number: 5,599,138
[45] Date of Patent: Feb. 4, 1997

[54] LANDFILL GARBAGE SYSTEM

[76] Inventors: Stanley M. Kozak; William M. Kozak; Murray L. Kozak, all of 1520 Percy Street, Brandon, Manitoba, Canada, R7A 7J4

[21] Appl. No.: 400,109

[22] Filed: Mar. 3, 1995

[51] Int. Cl.⁶ .................. B09B 1/00; B09B 3/00
[52] U.S. Cl. .................. 405/129; 241/DIG. 38
[58] Field of Search ................ 405/128, 129; 210/170, 747; 241/DIG. 38

[56] References Cited

U.S. PATENT DOCUMENTS

| | | | |
|---|---|---|---|
| 2,017,417 | 10/1935 | McCarthy | 405/129 |
| 3,533,775 | 10/1970 | Brown | 71/9 |
| 3,847,803 | 11/1974 | Fisk | 210/748 X |
| 3,897,215 | 7/1975 | Davidson, Jr. et al. | 241/DIG. 38 X |
| 4,159,944 | 7/1979 | Erickson et al. | 210/611 |
| 5,024,770 | 6/1991 | Boyd et al. | 405/129 X |
| 5,324,138 | 6/1994 | Hansen | 405/129 |
| 5,356,452 | 10/1994 | Fahey | 405/129 X |
| 5,415,496 | 5/1995 | DenBesten | 405/129 |

*Primary Examiner*—George A. Suchfield
*Attorney, Agent, or Firm*—Adrian D. Battison; Murray E. Thrift

[57] ABSTRACT

A procures for reducing waste material and recycling for use with household and other landfill waste material at a landfill waste management site. The process reduces the volume of waste material in the landfill site, allows for the natural breakdown of the organic components of the waste material, and allows for the recycling of some or all of the waste material.

11 Claims, 3 Drawing Sheets

5,599,138

LANDFILL GARBAGE SYSTEM

FIELD OF THE INVENTION

The present invention relates to a process for waste reduction and recycling for use with household and other landfill waste material at a landfill waste management site.

BACKGROUND OF THE INVENTION

Today the problem of disposing of waste materials particularly waste material of the type which is generally deposited at landfill waste management sites has become more acute.

Typically this waste material is household garbage, and non-toxic industrial and commercial waste such as wood, concrete, paper, food, glass, metals, old furniture, etc. These waste materials are collected and transported usually by truck or barge to a land fill site outside of the town or city limits.

Once at the landfill site the waste materials may be segregated somewhat to remove large metal objects, concrete and the like from the rest of the material. The remainder of the waste material is then usually simply covered over with earth and buried. In some locations where burning is allowed those items which may be burned are and the rest of the waste material is buried.

Many landfill sites are presently experiencing the problem of having to deal with too much waste material too quickly and are running out of available land to do so. As well the current method of simply burying the waste material under a layer of earth does not lead to the existence of the proper conditions for the natural break down of the organic component of the waste, and therefore the waste material does not break down. This contributes to the problem of land usage since land previously used for landfill cannot be reused in a reasonable length of time. This can result in increased costs due to the need to purchase additional land as the landfill becomes full.

The burning of some of the waste can help reduce the amount of waste material in a landfill site but this is prohibited by law in many places where air quality is a concern. This also does not allow for the recycling of any of the waste material which is burned.

A process for reducing waste material at a landfill waste management site is needed which reduces the volume of waste material in the landfill site, allows for the natural breakdown of the organic components of the waste material, and which allows for the recycling of some or all of the waste material.

SUMMARY OF THE INVENTION

It is one object of the present invention, therefore, to provide a process for reducing waste material at a landfill waste site which reduces the volume of waste material in the landfill site, allows for the natural breakdown of the organic components of the waste material, and which allows for the recycling of some or all of the waste material.

According to the present invention there is provided a process for waste reduction and recycling for use with household and other landfill waste material at a landfill waste management site comprising: grinding of waste materials at the site thereby reducing a volume of the waste material; placing the waste material in a pit dug into the ground at the site arranged to accept the waste material after grinding; composting of the waste material in the pit thus reducing organic material in said waste to humus; removing the waste material from the pit after composting; screening of the waste material after composting by screening means removing glass, metals, concrete, and other dense materials from the humus; separation of the waste material after composting by floatation means thereby separating and removing plastics and light materials from the humus.

Preferably a segregation step of most of the glass, metals, concrete, and other dense non-grindable materials from the rest of the waste material is conducted prior to grinding. Composting is accelerated by adding water to the waste material periodically during composting, and by adding compost enhancing bacteria to the waste material either during or after grinding.

Preferably the pit for composting includes sides which slope upwards gradually from a bottom of the pit in concave in shape such that a heavy vehicle can enter the pit. A plurality of pits are employed with the waste material being placed in a succeeding pit for composting as each pit becomes full. The number of pits is selected such that when the last pit is filled the waste material in a first pit is fully composted and may be removed making the first pit available to be refilled with waste material.

Preferably the floatation means employed is a water bath including a magnet to remove any metals not removed by the screening procedure.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
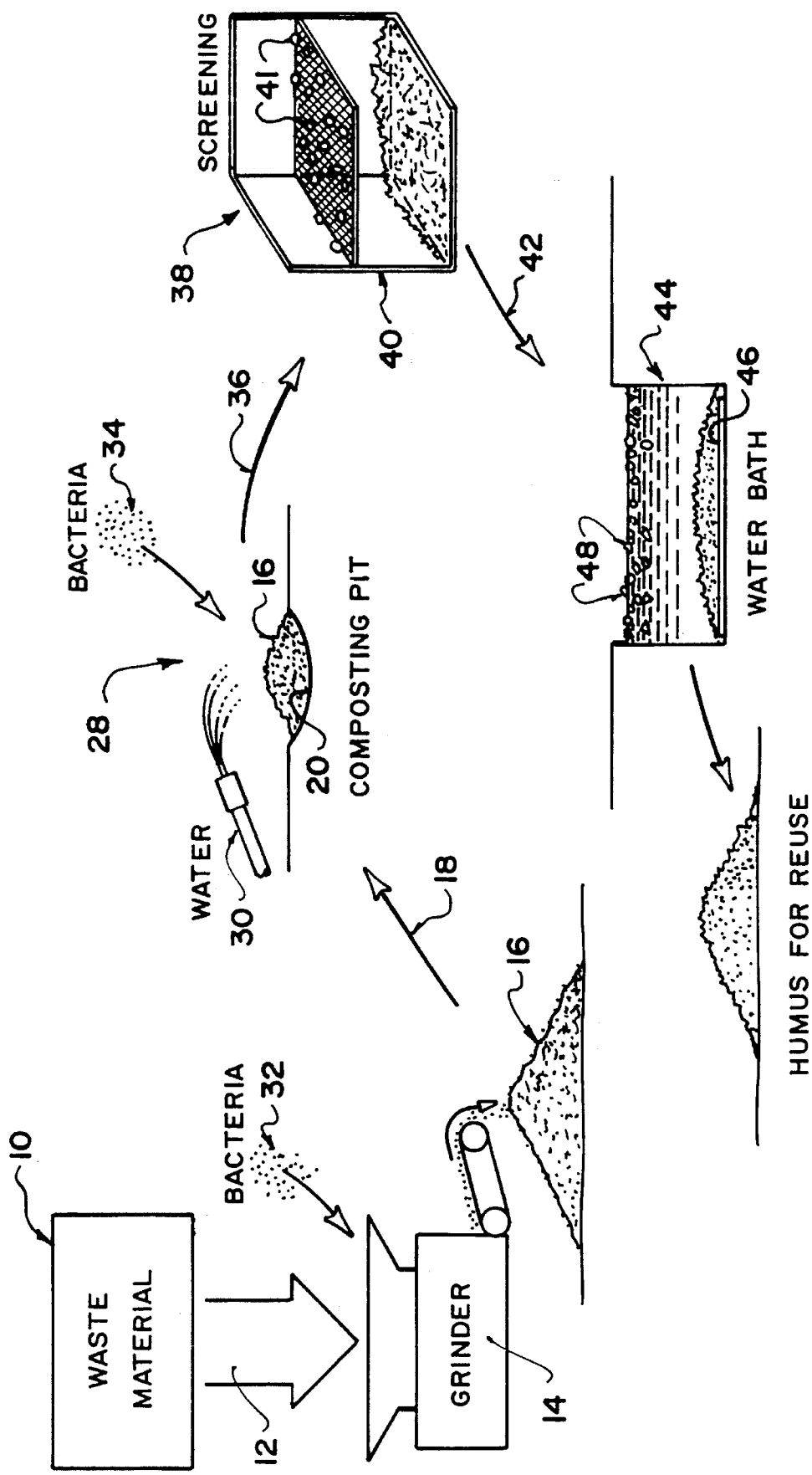
FIG. 1 is a schematic diagram of the entire process.

Referring to FIG. 1 the steps for the process of waste reduction and recycling for use with household and other-landfill waste material at a landfill waste management site are shown schematically.

Waste material 10 is trucked or otherwise transported to a landfill site for disposal. The waste material is segregated in the landfill prior to grinding 14 to keep material which the grinder may not be able to process separate from the material to be ground up. This includes items such as glass, concrete, metals and other dense non-grindable materials. Small quantities of glass, small pieces of concrete, as well as small and thin pieces of metal for example tin cans, nuts, bolts, nails, etc., may be left in the waste material to be ground up, however the more of this kind of material which can be kept separate before grinding 14 the better. Sorting and segregation of the waste material can also be performed before garbage collection but this is not required.

The first step in the process is grinding of the waste materials 14. This is done by transporting and loading 12 the materials usually by means of a front end loader or other heavy equipment into an appropriate heavy duty grinding means usually including a hopper and grinding mechanism. The grinding means grind the waste material into small pieces and deposit them into a pile 16. Grinding the waste material 14 reduces the volume of the waste material significantly and makes the next step of composting occur much more efficiently. The volume reduction will depend upon the degree of grinding 14 but a reduction in the order of 8 to 1 is known to be achievable. This in itself is a significant improvement over the current practice of simply piling up and burying the waste material.

After grinding 14 the waste material is transported and placed 18 into a pit 20 usually by means of a front end loader, bulldozer, or other heavy equipment. The pit 20 is dug into the ground and arranged to accept the ground up waste material 16 after grinding 14. Specially constructed or lined pits are not necessary or desirable in most cases since it is necessary that worms, bacteria, and insects naturally present in the ground be able to get to the waste material when in the pit 20. These worms, bacteria, and insects break down the waste material and if they are not present will need to be added to the waste material.

Figure 3:
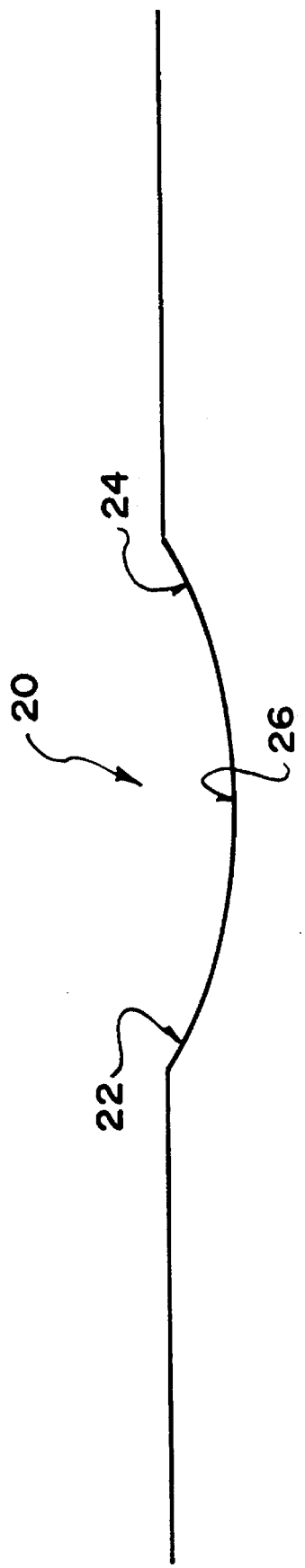
FIG. 3 is a side cross sectional view of a pit.

Referring to FIGS. 1 and 3 the pit 20 is preferably relatively shallow and concave in shape having sides 22 and 24 that slope gradually upwards from the bottom 26 of the pit 20 so that a heavy vehicle can enter the pit 20 easily and safely when depositing or removing the ground up waste material 16. Waste material which has been ground up during the grinding process 14 is continuously added until the pit has been filled.

The next step in the process is to allow composting 28 of the waste material in the pit 20 which reduces the organic portions of the ground up waste material to humus. By reducing the organic material to humus a further gain in land usage is achieved since the humus fills less volume than the ground up waste material 16 and much less volume than the raw waste material 10. The composting process 28 will for the most part take place naturally if the proper balance of conditions are maintained in the pit thereby reducing the organic portion of the material in the waste to usable humus. For composting to take place the right balance of moisture, availability of oxygen, and the presence of the right type of microorganisms is essential. The current practice in landfill sites of creating large piles of unground materials, compressing the piles with heavy equipment and covering the piles with soil prevents composting from occurring except at a very slow rate. By first grinding and composting the waste material in large open pits the composting process is significantly enhanced and speeded up.

To further enhance the composting of the waste material and help maintain the proper balance during composting water 30 is added to the waste material periodically. In addition to the water 30 compost enhancing bacteria over and above those already naturally present are added to the waste material. These compost enhancing bacteria may be added to the ground up waste material 16 either during the grinding process 32 or after grinding 34 when the material is in the pit 20.

The composting process 28 begins as soon as the ground up waste material 16 is placed in the pit 20 and does not wait until the pit is completely filled. However for the process of composting 28 to become complete a period of about two to three years will be needed during which the pit can not be used. This may be managed in a number of ways. A single large pit with a capacity for about 2 or 3 years worth of garbage may be employed which has a number of entrance points allowing access to separate parts of the pit so that waste material which is fully composted in one portion of the pit may be removed 36 and that part of the pit refilled and reused.

A second and preferred method is for a number of smaller pits to be employed with the waste material being placed in a succeeding pit for composting as each pit becomes full. Smaller shallower pits are preferable since they allow more of the volume of the waste material to be in contact with the ground and therefore is more readily available to the microorganisms, worms, etc., which break down the waste. The number of pits should be selected to ensure that when the last pit is filled the waste material in a first pit is fully composted and has be removed making the first pit available to be refilled with waste material. This method allows the land within the landfill site to be reutilized approximately every three or so years.

Figure 2:
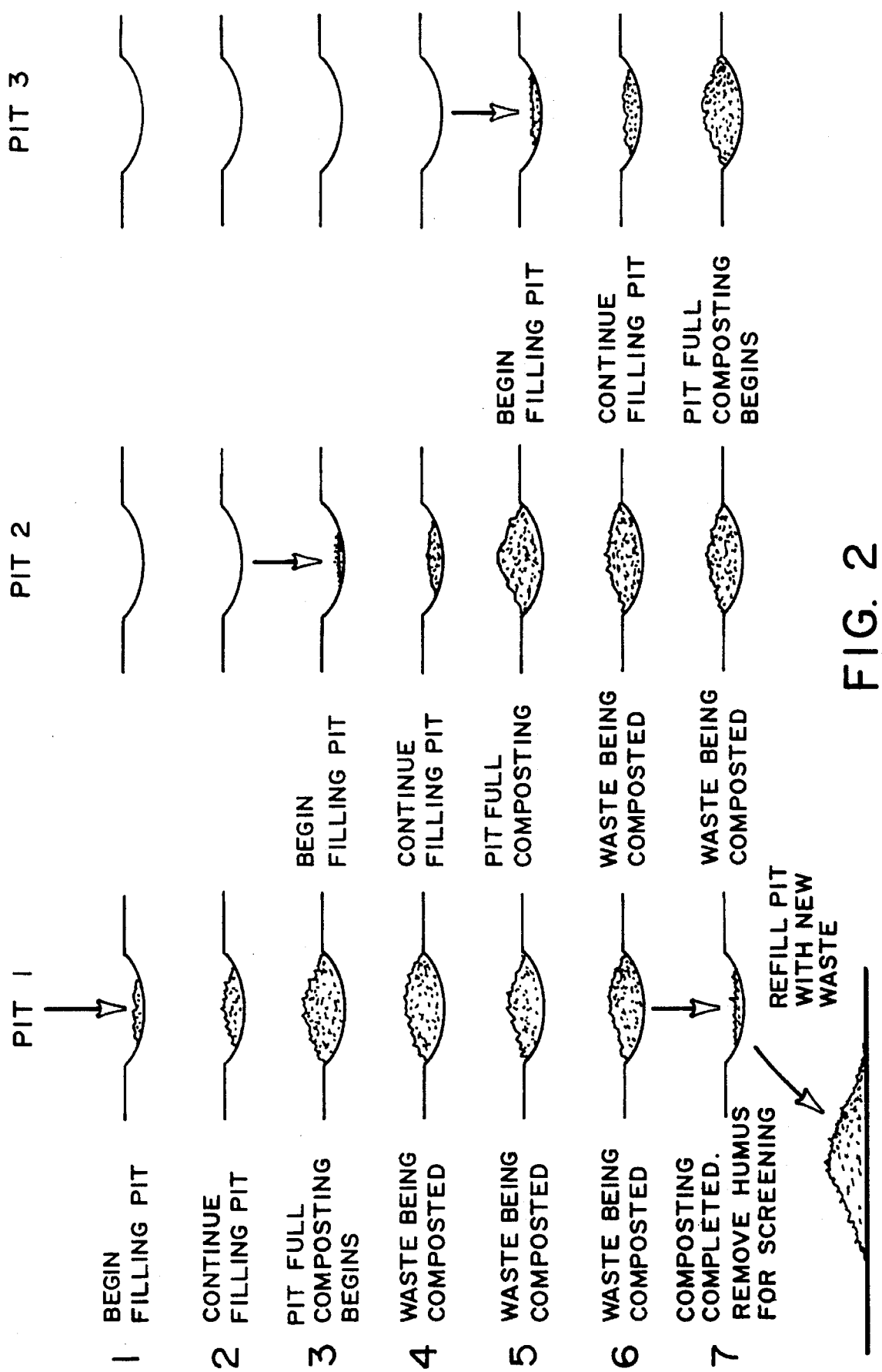
FIG. 2 is a schematic diagram showing the use of three composting pits in rotation.

Referring to FIG. 2 for small scale operations a three pit system is effective. Each Pit should be sized so that it becomes full after about one year. Phase 1 shows ground up waste material 16 being placed in Pit 1 with Pit 2 and Pit 3 remaining empty. During phases 2 and 3 Pit 1 is continuously filled with waste material until at the end of phase 3 Pit 1 is full. Once Pit 1 is full no additional waste will be added and composting will occur. At this point waste material is transported to Pit 2 and Pit 3 is left empty.

During phases 4 and 5 the material in Pit 1 is composting while Pit 2 is continuously filled with waste material until at the end of phase 5 Pit 2 is full. Like Pit 1 once Pit 2 is full no additional waste will be added and composting will occur. At this point waste material is transported to Pit 3.

During phases 6 and 7 the material in Pit 1 and Pit 2 is composting while Pit 3 is continuously filled with waste material. At the end of phase 7 Pit 3 is full. Like Pit 1 and Pit 2 once Pit 3 is full no additional waste will be added and composting will occur. The material in Pit 2 continues to compost while the waste material in Pit 1 is fully composted and the organic material has been turned into humus. The humus is removed from Pit 1 and moves on to the next step in the process. This frees Pit 1 to accept more waste material. The cycle repeats itself in Pit 2 and Pit 3. By continuous rotation of waste through the pits and the removal of the humus for further cleaning and reuse provides for a great reduction in the amount of land needed for operation of the landfill.

Referring to FIG. 1 the next step in the process is the removal the waste material 36 from the pit 20 after composting 28. Again this is done usually by means of a front end loader, bulldozer, or other heavy equipment. At this point all the organic material in the waste has been reduced to humus.

The next step in the process is screening 38 of the waste material after composting which is now humus and inorganic materials to clean the humus. Screening is performed by screening means 40 which usually includes a hopper, one or more screens of varying sizes, and a means for passing the humus and inorganic material though the screen. The humus and inorganic material is loaded into the screening means 40 usually by means of a front end loader, bulldozer, or other heavy equipment. The screening means 40 removes any glass, metals, concrete, and other dense materials 41 which where present in the ground up waste material from the humus. These materials 41 may be separated and sorted for recycling or may be simply buried within the landfill.

After screening 38 the humus and any remaining inorganic material which passed through the screening process 38 is transported to a water bath 44 for separating. The humus and inorganic material is transported to the water bath 44 usually by means of a front end loader, bulldozer, or other heavy equipment. The water bath 44 preferably includes a magnet 46 to remove any metals which passed through the screening process. The water bath separates any light material 48 for example plastics which did not break down during the composting process. The light materials 48 are separated since the humus will sink in the water while the light materials 48 will float on or near the surface where they can be easily removed from the water bath 44.

Once the humus has been passed through the water bath it is removed, dried and then spread at the landfill site or sold for use at other locations.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A process for waste reduction of household and other landfill waste material at a landfill waste management site comprising:

grinding of waste materials thereby reducing a volume of the waste material;

placing the waste material in a pit dug into the ground arranged to accept the waste material after grinding;

composting of the waste material in the pit thereby reducing organic material in said waste to humus;

removing the waste material from the pit after composting;

screening of the waste material after composting thus removing glass, metals, concrete, and other dense materials from the humus;

separation of the waste material after composting by floatation means thereby separating and removing plastics and light materials from the humus.

2. The process in accordance with claim 1 wherein segregation of most of the glass, metals, concrete, and other dense non-grindable materials from the rest of the waste material is conducted prior to grinding.

3. The process in accordance with claim 1 wherein composting is accelerated by adding compost enhancing bacteria to the waste material.

4. The process in accordance with claim 1 wherein composting is accelerated by adding water to the waste material periodically during composting.

5. The process in accordance with claim 1 wherein the pit includes sides which slope upwards gradually from a bottom of the pit such that a heavy vehicle can enter the pit.

6. The process in accordance with claim 5 wherein the pit is concave in shape.

7. The process in accordance with claim 6 wherein a plurality of pits are employed.

8. The process in accordance with claim 7 wherein waste material is placed in a succeeding pit for composting as each pit becomes full.

9. The process in accordance with claim 8 wherein the number and size of the pits is selected in dependence upon the rate of supply of waste materials such that when a last pit is filled the waste material in a first pit is fully composted and may be removed making the first pit available to be refilled with waste material.

10. The process in accordance with claim 1 wherein the floatation means is a water bath.

11. The process in accordance with claim 1 wherein the floatation means includes a magnet to remove any metals not removed by the screening procedure.

\* \* \* \* \*